United States Patent [19]

Itoh et al.

[11] 4,333,711
[45] Jun. 8, 1982

[54] ZOOM LENS FOR COPYING

[75] Inventors: Takayuki Itoh, Tokyo; Ryota Ogawa, Kawagoe; Yasunori Arai, Asaka, all of Japan

[73] Assignee: Asahi Kogaku Kogyo Kabushiki Kaisha, Tokyo, Japan

[21] Appl. No.: 154,261

[22] Filed: May 29, 1980

[30] Foreign Application Priority Data

Jun. 20, 1979 [JP] Japan .................. 54-77925

[51] Int. Cl.³ .......................... G02B 15/14
[52] U.S. Cl. ................................. 350/426
[58] Field of Search ........................ 350/426

[56] References Cited
FOREIGN PATENT DOCUMENTS 2750342  5/1978  Fed. Rep. of Germany ...... 350/426

Primary Examiner—John K. Corbin
Assistant Examiner—Rebecca D. Gass
Attorney, Agent, or Firm—Sughrue, Mion, Zinn, MacPeak and Seas

[57] ABSTRACT

A zoom lens for a copying system capable of both magnification and reduction of the image of an original to be copied in which the overall lens system may be miniaturized but yet various aberrations such as distortion are well corrected for. The lens includes a first lens group having a negative focal length and a second lens group having a positive focal length disposed in that order from the object side of the lens system. The distance between the first and second lens groups is variable while the distance between the object surface and the image surface is maintained constant. Movement of the first lens group serves primarily to maintain constant the distance between the object and image surfaces while the movement of the second lens group serves mainly to provide a variator effect.

1 Claim, 3 Drawing Figures

SPHERICAL ABERRATION
CHROMATIC ABERRATION
SINE CONDITION

ASTIGMATISM

DISTORTION

ZOOM LENS FOR COPYING

BACKGROUND OF THE INVENTION

Most copying systems employ a fixed focus lens. Should it be desired to vary the magnification of the lens, it is necessary that the lens be suitably moved so that the relative distance between the object and image surfaces is varied. The present invention relates however to a lens system in which the distance between the object and image surfaces is maintained constant and the lens system is moved therebetween enabling variation copying.

Prior art copying lens systems may be classified into two groups, one group having a wide range of magnification extending from a minimum reduced size to a maximum enlarged size and the other having a narrow range of magnification extending only from the reduced size to the size of the original or from the size of the original to the enlarged size. A lens system of the first type is disclosed in unexamined Japanese Patent Publication Nos. 49/1242 and 53/60655 and Japanese Patent Application 53/84872 which are assigned to the assignee of the present application. In these lens systems, the magnification variation ratio is high resulting in the lens system having a large physical size. Such a lens system moreover requires three or four separate lens groups with the result that the movements of the lens groups are intricate for maintaining constant the distance between the object surface and the film surface.

The latter case is disclosed in unexamined Japanese Patent Publication No. 54/44554 which relates to a simple lens having a small magnification variation ratio of less than 2. This lens is composed of two lens groups in which the refractive power of the first lens group is extremely small and is fixed at one end of the variational range. In spite of a very small magnification variation ratio of about 1.4, the variation of the overall focal length is extremely small. For this reason, when a magnification value in the range from the minimum reduced value to equal magnification value is used, the first lens group must have a negative refractive power which simultaneously the distance between the first and second lens groups must be lengthened thereby disadvantageously increasing the size of the lens system. When a magnification value in the range from the point of equal magnification to the maximum enlarged value is used, the first lens group must have a positive refractive power while for equal magnification and the distance between the lens group must also be increased thereby again increasing the size of the lens system.

It is an object of the present invention to facilitate the photographic operation of a camera such as a large size printing camera and a duplicating camera by fixing the picture base and the image surface. Also it is another object to provide a camera used in an optical system for a copying machine in which the copy size can be varied. Particularly, in such a copying lens, it is desirable that various aberrations be well corrected for and that there be provided a sufficient quantity of marginal light.

A yet further object of the present invention is to provide a practical and useful zoom lens system for copying with the maximum magnification variation being below a value of approximately two. It is also an object of the invention to provide such a lens system which is very simple in construction and which is composed of two lens groups. It is further an object of the invention to provide such a lens system in which the negative refractive power of the first lens group and the positive refractive power of the second lens group are both stressed so that the overall system may be miniaturized and, in spite of the resulting strong asymmetrical pattern of the lens system, various aberrations, particularly distortion, are well corrected for.

SUMMARY OF THE INVENTION

These, as well as other objects of the invention, are met by a zoom lens for a copying system including, in order from the object side, a first lens group having a negative focal length and a second lens group having a positive focal length with the distance between the first and second lens groups being variable while the distance between the object surface and the image surface is maintained constant. The movement of the first lens group is primarily to maintain constant the distance between the object and image surfaces while movement of the second lens serves primarily a variator effect. The first lens group includes a first negative meniscus lens convex toward the object and a first positive meniscus lens convex toward the object. The second lens group is composed of a fixed focus lens and a diaphragm. The fixed focus lens includes, in order from the diaphragm, a second positive meniscus lens concave toward the diaphragm, a second negative meniscus lens concave toward the diaphragm and a third positive meniscus lens concave toward the object with the third positive and second negative meniscus lenses being cemented to one another and with the second and third positive meniscus lenses and the second negative meniscus lens disposed on the object side of the diaphragm. On the image side of the diaphragm there are disposed, in order from the diaphragm, a fourth positive meniscus lens concave toward the diaphragm, a third negative meniscus lens concave toward the diaphragm, and a fifth positive meniscus lens concave toward the diaphragm with the fifth positive and third negative meniscus lenses being cemented to one another. The various individual lenses of the zoom lens satisfy disposed conditions so that the negative refractive power of the first lens group and the positive refractive power of the second lens group are both stressed so that the overall zoom lens may be miniturized and in which various aberrations, particularly distortion, are well corrected for.

DESCRIPTION OF THE PREFERRED EMBODIMENTS

Figure 1:
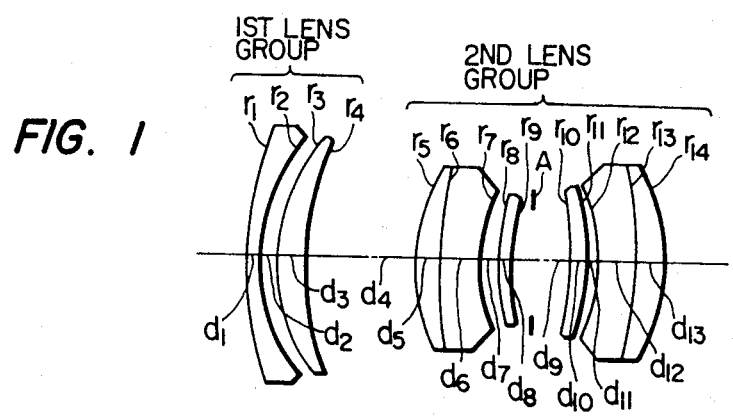
FIG. 1 is a cross-sectional view of a lens system according to the invention at a position for image reduction.
Figure 2B:
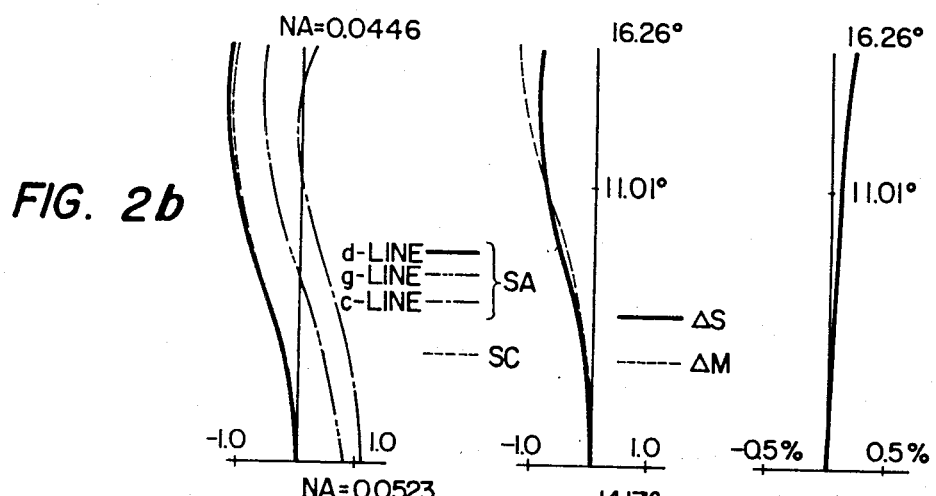
FIGS. 2a and 2b are graphs showing various aberrations of FIG. 1 where FIG. 2a relates to image reduction and FIG. 2b to minus one magnification and wherein $r_i$ is the radius of curvature of each lens surface, $d_i$ is the lens thickness or the distance between respective adjacent lenses, and A is the position of the stop diaphragm.
Figure 2A:
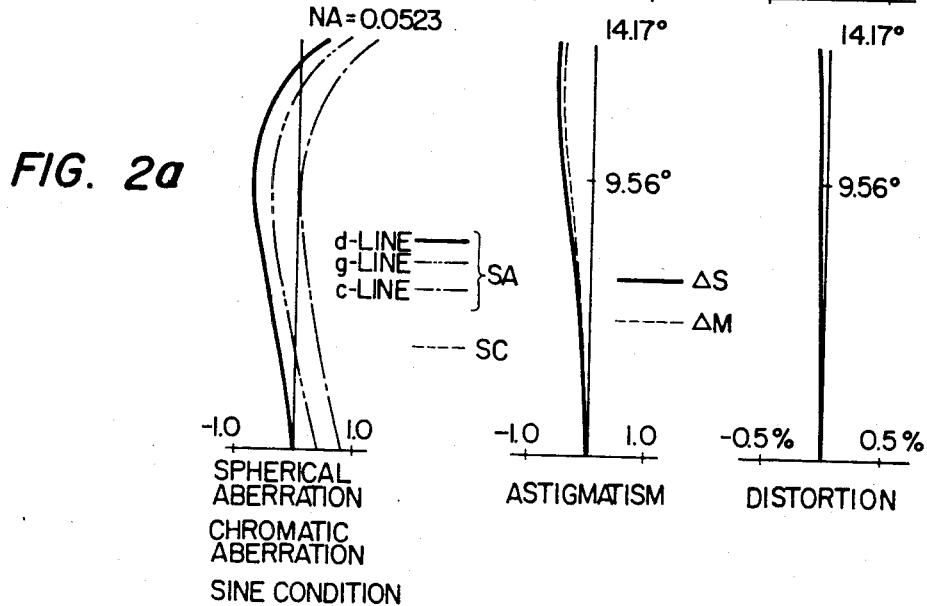

The present invention will hereinafter be described in detail.

A zoom lens for a copying system in accordance with the invention includes, in order from the object side, a first lens group having a negative focal length and a second lens group having a positive focal length. The distance between the first and second lens groups is variable while the distance between the object surface and the image surface is maintained constant. The zoom lens for a copying system according to the present invention is characterized in that the movement of the first lens group serves primarily to maintain constant the distance between the object and image surfaces while the movement of the second lens group serves mainly to provide a variator effect. The first lens group is composed of a negative meniscus lens convex toward the object and a positive meniscus lens convex toward the object. The second lens group includes a fixed focus lens. With respect to the stop diaphragm, the second lens group includes, in order from the diaphragm on the object side, a positive meniscus lens concave toward the diaphragm, and negative and positive meniscus lenses concave toward the diaphragm, the last mentioned two lenses being cemented to each other. Similarly, the second lens group is composed, in order from the diaphragm on the image side, of a positive meniscus lens concave toward the diaphragm and a lens composed of a negative meniscus lens concave toward the diaphragm and a positive meniscus lens concave toward the diaphragm cemented together. The zoom lens of the invention also satisfies the following conditions:

$$1.1 < (M_{max}/M_{min}) < 2.0, \quad (1)$$

$$3.0 < (|f_I|/f_{min}) < 8.0, \quad (2)$$

$$0.15 < (r_{IP}/f_{min}) < 0.35, \quad (3)$$

$$0.05 < (\Delta D_{I,II}/f_{min}) < 0.30, \text{ and} \quad (4)$$

$$0.25 < (D_{1 \sim A}/f_{min}) < 0.60 \quad (5)$$

where: $M_{max}$ is the maximum magnification value in the high magnification variation range, $M_{min}$ is the minimum magnification value in the low magnification variation range for the reduced values range, $M_{max}/M_{min}$ is a magnification variation ratio defined by their values, $f_{min}$ is the overall focal length at the reduction end, $f_I$ is the focal length of the first lens group, $r_{IP}$ is the radius of curvature of the positive lens on the object side in the first lens group, $\Delta D_{I,II}$ is the range of the distance between the first and second lens groups, and $D_{1 \sim A}$ is the distance from the first lens surface to the stop diaphragm at the reduction end.

The first lens group is composed of a negative lens and a positive lens with which various aberrations such as chromatic aberration are compensated for to some extent with variations of the various aberrations prevented over the permissible range of zoom positions. More specifically, the first lens group is composed of a negative meniscus lens convex toward the object and a positive meniscus lens convex toward the object with which distortion aberration is maintained extremely small over the entire magnification range while at the same time the variation of distortion is maintained small.

Condition (1) above represents the magnification variation ratio of the lens system according to the present invention. Below the lower limit, the magnification variation ratio would be too small so that the lens system would perform substantially the same as a fixed focus lens system. On the other hand, above the upper limit, distortion would be excessively large for a two-lens group type lens system. As a result, such a lens system would not be suitable for a copying lens system which require a high degree of compensation for distortion aberration.

Conditions (2) and (3) are related to the first lens group. If the upper limit of the inequality (2) were to be exceeded, although acceptable for aberration correction, the negative lens power of the first lens group would be too small resulting in a necessary enlargement of the diameter of the first lens group. In contrast, if the power limit of the inequality (2) were exceeded, although acceptable for miniaturization, the negative refractive power of the first lens group would be excessive thereby emphasizing any asymmetries and resulting in an increase in distortion. On the other hand, above the upper limit of the inequality (3), although acceptable for aberration correction, the lens power of the first lens group would have to be correspondingly weakened and the distance between the negative and positive lenses in the first lens group increased thereby resulting in a necessity for increasing the diameter of the first lens group.

Condition (4) operates with the condition (2) to define the refractive power distribution. If the upper limit is exceeded, although the lens is then acceptable for the aberration compensation, the overall size of the lens system would be large. If the lower limit were exceeded, in order to maintain a desirable magnification variation ratio, it would be required that the refractive powers of the first and second lens groups be strengthened thereby making the asymmetry of the lens excessive and making the lens unsuitable for aberration compensation.

Condition (5) relates directly to the determination of the diameter of the first lens group. Above the upper limit, the first lens group diameter would have to disadvantageously increase. The lower limit is a margin determined by suitable aberration compensation in compliance with the invention.

A split dagor type lens, a heliar type lens, or other suitable lens types which are well known for use in copying lens systems of a fixed focus type may be used for the second lens group of the present invention. A split dagor type optical system, which is the most commonly used, is preferred for use in the present invention. The construction of the present second lens group will hereinafter be described accordingly.

In the second lens group, with respect to the stop diaphragm A, on the object side are disposed a positive meniscus lens concave toward the diaphragm and negative and positive meniscus lenses concave toward the diaphragm which are cemented to each other. Similarly, on the image side are disposed, in order, a positive meniscus lens concave toward the diaphragm and negative and positive meniscus lenses concave toward the diaphragm, the latter two being cemented to each other. This arrangement thereby forms a so-called split dagor type optical system.

An example of a lens system embodying the present invention is hereinafter described in the table which follows. In the table, r is the radius of curvature, d is the lens thickness or the distance between the adjacent lenses, N is the refractive index at the d-line, $\nu$ is Abbe number, f is the overall focal length, $F\infty$ is the F number for an infinite object, M is the magnification, $\omega$ is half the viewing angle with respect to the central axis of the lens, and NA is the index of aperture which is represented by the equation:

$$NA = \frac{1}{2F_\infty(1 + |M|)}$$

The various lens surfaces are identified by the subscripts i of the radii of curvature $r_i$ indicated in FIG. 1.

EXAMPLE $F_\infty = 5.6$  $f = 247.2 - 255.0$ $NA = 0.0523 \sim 0.0446$  $M = -1/\sqrt{2} \sim -1$ $\omega = 14.17° \sim 16.26°$

| Surface No. | r | d | N | v |
|---|---|---|---|---|
| 1 | 98.943 | 5.00 | 1.51633 | 64.1 |
| 2 | 54.662 | 6.09 | | |
| 3 | 54.954 | 9.99 | 1.51112 | 60.5 |
| 4 | 81.487 | 38.06 ∼ 5.00 | | |
| 5 | 53.339 | 9.01 | 1.69350 | 53.2 |
| 6 | 167.595 | 12.42 | 1.61293 | 37.0 |
| 7 | 41.833 | 7.10 | | |
| 8 | 65.070 | 4.50 | 1.60311 | 60.7 |
| 9 | 110.597 | 19.91 | | |
| 10 | −149.268 | 5.00 | 1.60311 | 60.7 |
| 11 | −76.765 | 5.74 | | |
| 12 | −43.201 | 12.51 | 1.57309 | 42.6 |
| 13 | −107.943 | 9.07 | 1.67790 | 55.3 |
| 14 | −60.832 | | | |

$M_{max}/M_{min} = 1.414$
$|f_I|/f_{min} = 5.1$
$r_{IP}/f_{min} = 0.222$
$\Delta D_{I,II}/f_{min} = 0.134$
$D_{I \sim A}/f_{min} = 0.393$

We claim:

1. A zoom lens for a copying system comprising, in order from the object side, a first lens group having a negative focal length and a second lens group having a positive focal length, the distance between said first and second lens groups being variable while the distance between the object surface and the image surface is maintained constant, movement of said first lens group being primarily to maintain constant the distance between the object and image surfaces and movement of said second lens group serving primarily a variator effect, said first lens group comprising a first negative meniscus lens convex toward the object and a first positive meniscus lens convex toward the object, said second lens group comprising a fixed focus lens used for copying and a diaphragm, said fixed focus lens comprising, in order from said diaphragm, a second positive meniscus lens concave toward said diaphragm, a second negative meniscus lens concave toward said diaphragm and a third positive meniscus lens concave toward the object, said third positive meniscus lens and said second negative meniscus lens being cemented to one another, said second and third positive meniscus lenses and said second negative meniscus lens being disposed on the object side of said diaphragm and, in order from said diaphragm, a fourth positive meniscus lens concave toward said diaphragm, a third negative meniscus lens concave toward said diaphragm, and fifth positive meniscus lens concave toward said diaphragm, said fifth positive meniscus lens and said third negative meniscus lens being connected to one another, said fourth and fifth positive meniscus lenses and said third negative meniscus lens being disposed on the image side, and said zoom lens satisfying the following conditions:

$F_\infty = 5.6$  $f = 247.2 - 255.0$ $NA = 0.0523 \sim 0.0446$  $M = -1/\sqrt{2} \sim -1$ $\omega = 14.17° \sim 16.26°$

| Surface No. | r | d | N | v |
|---|---|---|---|---|
| 1 | 98.943 | 5.00 | 1.51633 | 64.1 |
| 2 | 54.662 | 6.09 | | |
| 3 | 54.954 | 9.99 | 1.51112 | 60.5 |
| 4 | 81.487 | 38.06 ∼ 5.00 | | |
| 5 | 53.339 | 9.01 | 1.69350 | 53.2 |
| 6 | 167.595 | 12.42 | 1.61293 | 37.0 |
| 7 | 41.833 | 7.10 | | |
| 8 | 65.070 | 4.50 | 1.60311 | 60.7 |
| 9 | 110.597 | 19.91 | | |
| 10 | −149.268 | 5.00 | 1.60311 | 60.7 |
| 11 | −76.765 | 5.74 | | |
| 12 | −43.201 | 12.51 | 1.57309 | 42.6 |
| 13 | −107.943 | 9.07 | 1.67790 | 55.3 |
| 14 | −60.832 | | | |

$M_{max}/M_{min} = 1.414$
$|f_I|/f_{min} = 5.1$
$r_{IP}/f_{min} = 0.222$
$\Delta D_{I,II}/f_{min} = 0.134$
$D_{I \sim A}/f_{min} = 0.393$

* * * * *